United States Patent
Le Grand

(10) Patent No.: US 7,725,518 B1
(45) Date of Patent: May 25, 2010

(54) WORK-EFFICIENT PARALLEL PREFIX SUM ALGORITHM FOR GRAPHICS PROCESSING UNITS

(75) Inventor: Scott M. Le Grand, Soquel, CA (US)

(73) Assignee: NVIDIA Corporation, Santa Clara, CA (US)

( * ) Notice: Subject to any disclaimer, the term of this patent is extended or adjusted under 35 U.S.C. 154(b) by 349 days.

(21) Appl. No.: 11/836,027

(22) Filed: Aug. 8, 2007

(51) Int. Cl.
*G06F 7/00* (2006.01)
*G06F 7/38* (2006.01)
*G06F 9/455* (2006.01)

(52) U.S. Cl. .............. 708/490; 707/791; 718/106
(58) Field of Classification Search ............ 708/670, 708/490; 707/2, 899, 611, 637, 764, 791; 712/7, 205; 717/140
See application file for complete search history.

(56) References Cited

U.S. PATENT DOCUMENTS

| | | | |
|---|---|---|---|
| 5,799,300 A * | 8/1998 | Agrawal et al. | 707/5 |
| 5,890,151 A * | 3/1999 | Agrawal et al. | 707/5 |
| 7,584,342 B1 | 9/2009 | Nordquist et al. | |
| 2002/0062435 A1 * | 5/2002 | Nemirovsky et al. | 712/7 |
| 2007/0260663 A1 * | 11/2007 | Frigo et al. | 708/490 |
| 2008/0052689 A1 * | 2/2008 | Archambault et al. | 717/140 |
| 2008/0140994 A1 * | 6/2008 | Khailany et al. | 712/205 |
| 2008/0184211 A1 | 7/2008 | Nickolls et al. | |

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

"prefix sum", Wikipedia.*
Eggers, et al., "Simultaneous Multithreading: A Platform for Next-Generation Processors," *IEEE Micro*, vol. 17, No. 5, pp. 12-19, Sep./Oct. 1997.
Office Action. U.S. Appl. No. 11/836,034 dated Sep. 29, 2009.

* cited by examiner

*Primary Examiner*—Hung T Vy
(74) *Attorney, Agent, or Firm*—Patterson & Sheridan, LLP

(57) ABSTRACT

One embodiment of the present invention sets forth a technique for computing a parallel prefix sum using one or more cooperative thread arrays (CTA) within a graphics processing unit. The prefix sum input list is partitioned and distributed to each CTA. Within each CTA, the input list is further partitioned for processing by individual threads in a way that avoids access conflicts to memory. Each list partition within the CTA is assigned to one of a plurality of concurrent threads, which executes a prefix sum operation the partition. The final values of the prefix sum operations form a list that is then subjected to a second prefix sum operation. Each element of the second prefix sum operation is added to each element of the subsequent partition, completing the prefix sum operation within the CTA. This technique may be extended to prefix sum operations that span two or more CTAs.

21 Claims, 12 Drawing Sheets

US 7,725,518 B1

WORK-EFFICIENT PARALLEL PREFIX SUM ALGORITHM FOR GRAPHICS PROCESSING UNITS

BACKGROUND OF THE INVENTION

1. Field of the Invention

Embodiments of the present invention relate generally to parallel processing and more specifically to a work-efficient parallel prefix sum algorithm for graphics processing units.

2. Description of the Related Art

A typical computer system includes, without limitation, a central processing unit (CPU), a graphics processing unit (GPU), a display device, and one or more input devices. The user interacts with a software application executing within the computer system by operating at least one input device and observing the results on the display device. The CPU typically executes the overall structure of the software application and configures the GPU to perform specific tasks. In current technology, the CPU tends to offer more general functionality using a relatively small number of large execution threads, while the GPU is capable of very high performance using a relatively large number of small, parallel execution threads on dedicated hardware processing units.

A typical software application may include certain functionality designed to execute on the CPU, while other functions execute on the GPU. For example, the CPU may be configured to run the graphical user interface (GUI) for the application and perform certain application-specific logic, whereas the GPU may be configured to perform computationally intensive tasks, such as rendering graphics images. Software applications typically execute as much computation on the GPU as possible to improve overall system performance. However, certain types of common operations are not easily or efficiently mapped to the parallel architecture of the GPU. When the application performs a computation that does not have an efficient mapping to the parallel architecture of the GPU, a "work-inefficient" processing step is commonly needed, wherein the GPU processes related data with relatively low overall processor utilization for the duration of the processing step. Alternately, the CPU may perform the processing step instead of the GPU. Whenever the GPU processor utilization is low or the CPU needs to perform certain processing steps for the GPU, overall performance and efficiency are reduced.

As is well known, one common processing step used in a wide range of applications is a "prefix sum" operation. A prefix sum operation generates a list that is a running accumulated sum over a list of elements. For example, the prefix sum of list: {1, 2, 3, 4} is the list: {1, 1+2, 1+2+3, 1+2+3+4}, or simply: {1, 3, 6, 10}. In conventional systems, running prefix sum operations on GPUs is inherently work-inefficient. Therefore, each time a prefix sum operation is performed, the work-efficiency of the system is diminished, reducing overall performance. For larger lists, the reduction in performance may be larger, limiting the usefulness of this common operation in GPU-based applications.

As the foregoing illustrates, what is needed in the art is a technique for performing efficient prefix sum operations on a GPU.

SUMMARY OF THE INVENTION

One embodiment of the present invention sets for a method for performing a parallel prefix sum operation. The method includes the steps of (i) partitioning an input list of data elements into a plurality of sub-lists that includes a first sub-list and a second sub-list, (ii) performing a first prefix sum operation on the first sub-list to generate a first intermediate prefix sum sub-list, and performing a second prefix sum operation on the second sub-list to generate a second intermediate prefix sum sub-list, where a last element of the first intermediate prefix sum sub-list comprises a first sub-list accumulated sum value, and a last element of the second intermediate prefix sum sub-list comprises a second sub-list accumulated sum value, (iii) performing a second prefix sum operation across the first and second sub-list accumulated sum values to generate a first accumulated sum value and a second accumulated sum value, and (iv) adding the first accumulated sum value to each data element of the second intermediate prefix sum sub-list to produce a third intermediate prefix sum sub-list, where a combination of the first intermediate prefix sum sub-list and the third intermediate prefix sum sub-list is equivalent to a prefix sum over the first sub-list and the second sub-list.

One advantage of the disclosed method is that it enables an efficient distribution of work associated with a prefix sum operation across a large number of threads executing within the processing cores of a GPU. Thus, overall system performance is improved when performing prefix sum operations relative to prior art techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
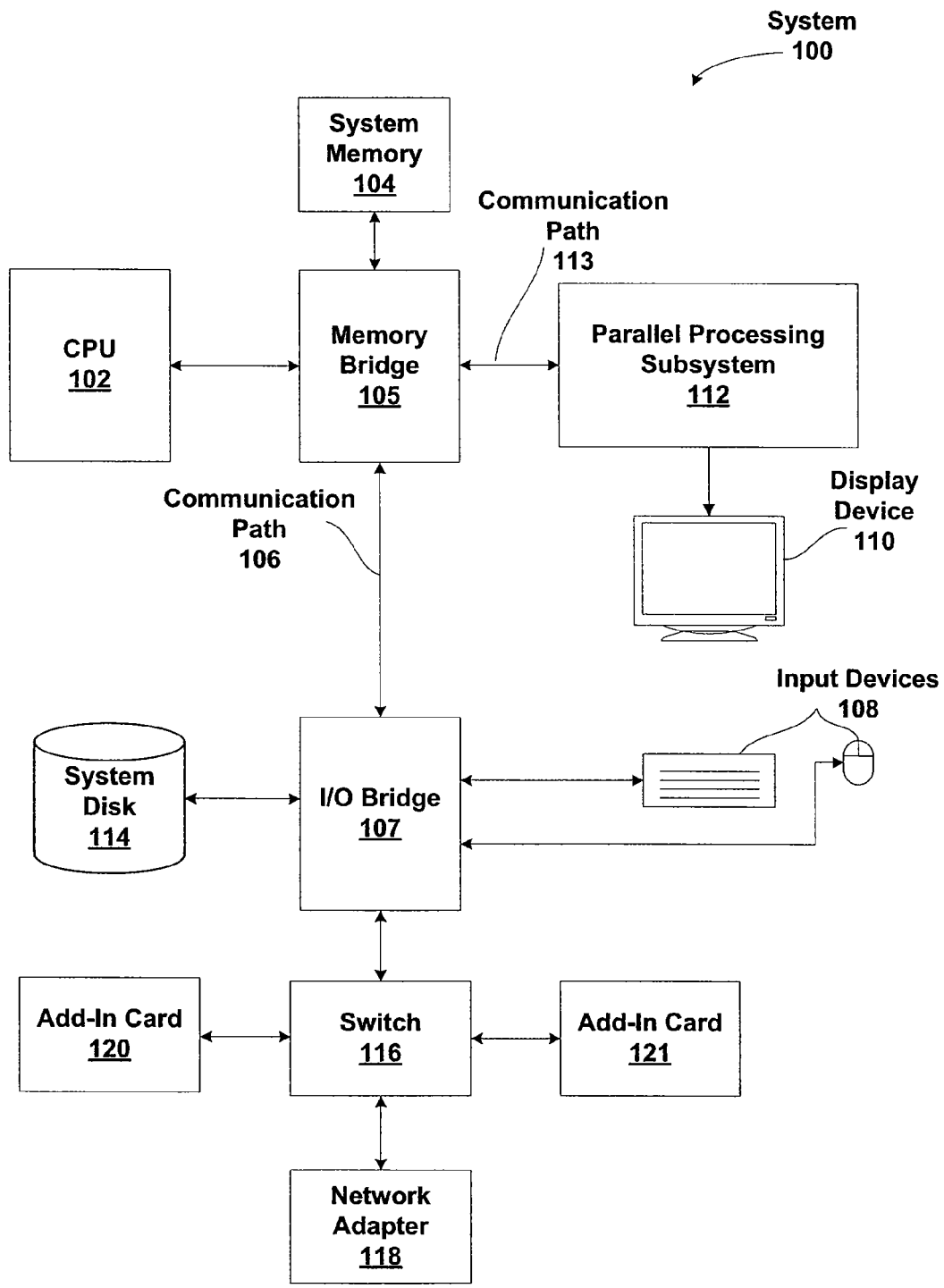
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
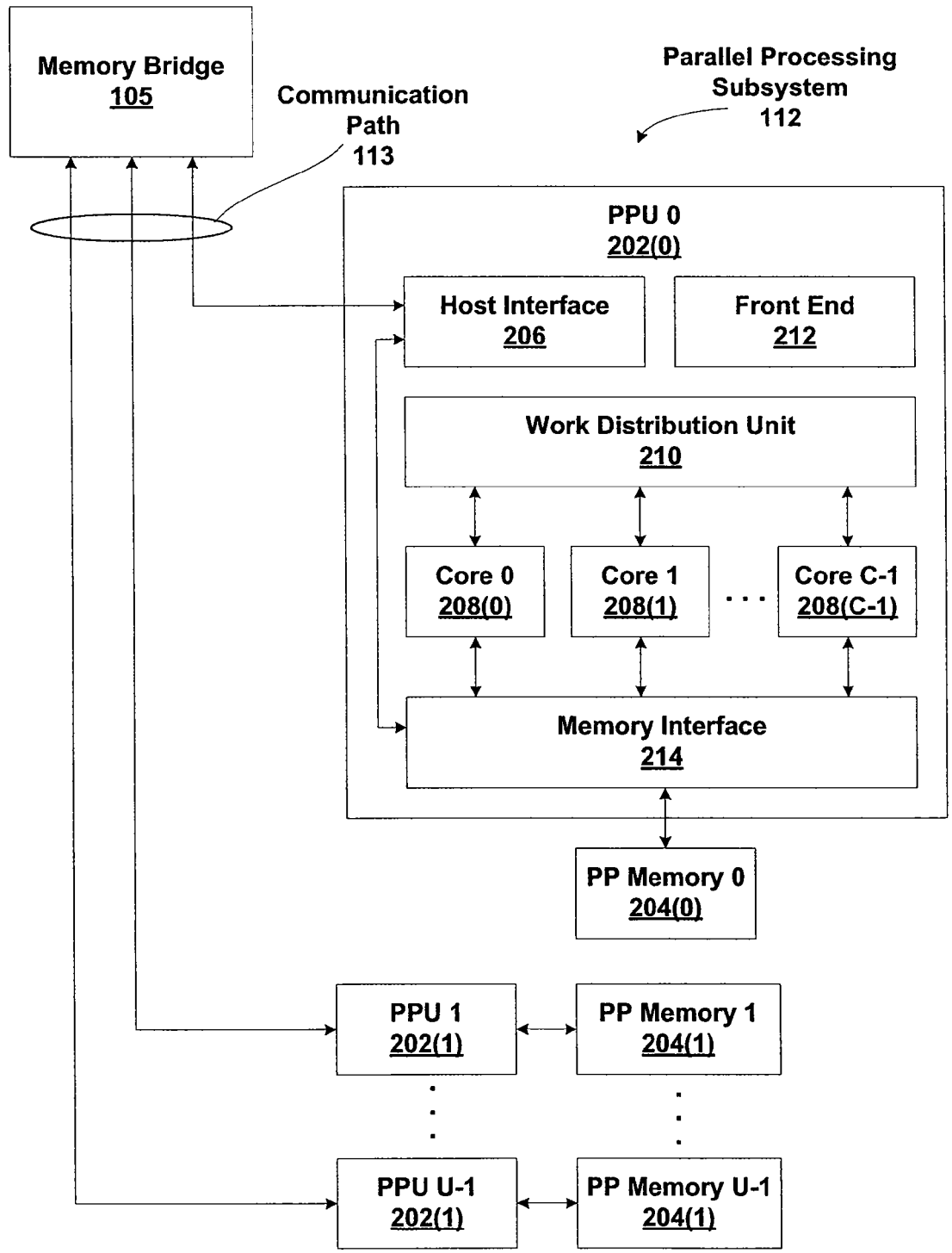
FIG. 2 illustrates a parallel processing subsystem, according to one embodiment of the invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
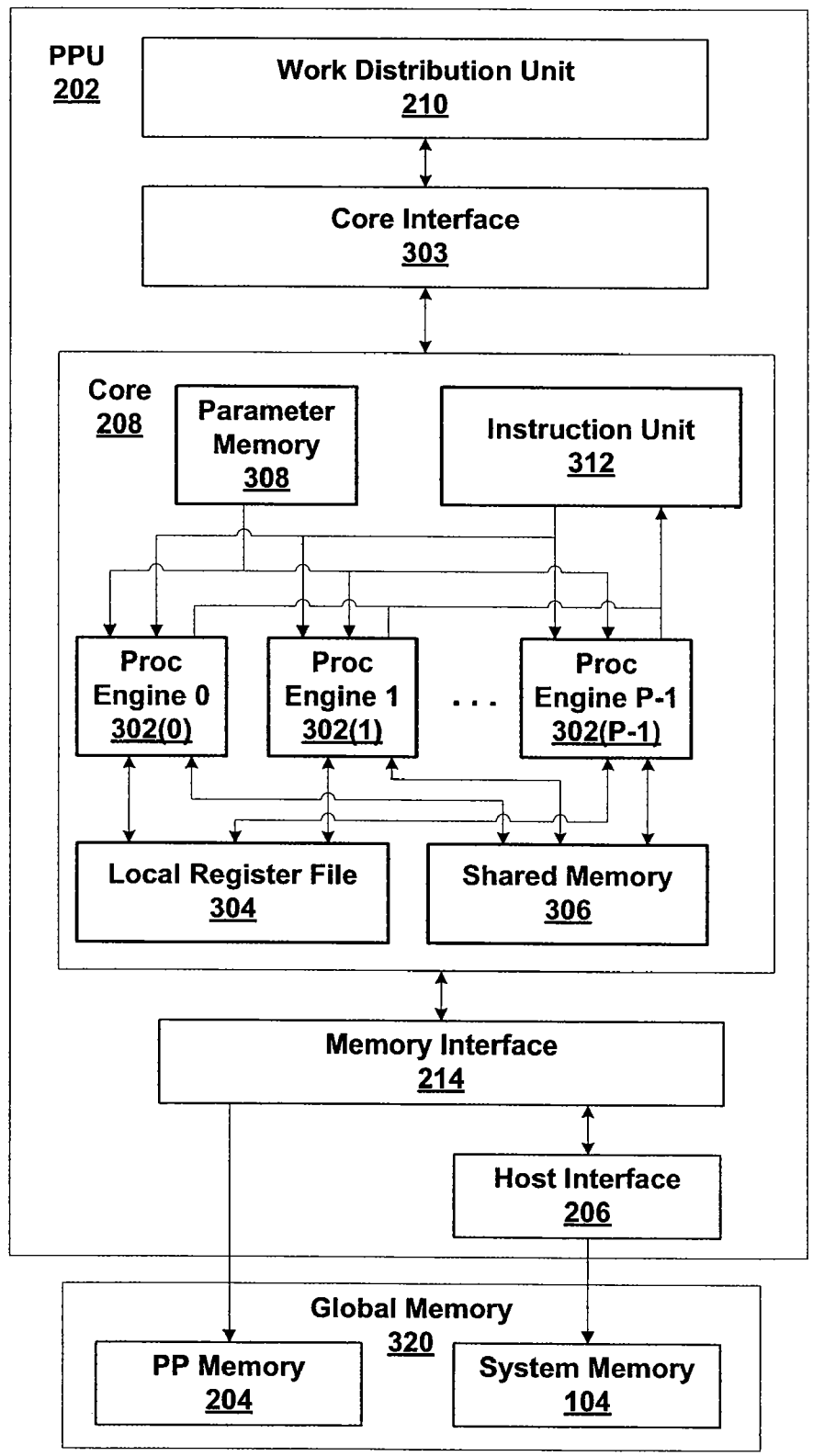
FIG. 3 is a block diagram of a parallel processing unit for the parallel processing subsystem of FIG. 2, in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

As is well known, a SIMD core 208 executes a single instruction on different data across a plurality of parallel processing engines 302 included in the core 208. Thus, for example, the core 208 is configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "thread group." Additionally, a plurality of thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is also an integer multiple of the number of parallel processing engines 302 in a core 208, and m is the number of thread groups simultaneously active on the core 208. The size of a CTA is generally determined by the amount of hardware resources, such as memory or registers, available to the CTA.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided.

In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache (s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multi-threaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD thread groups." As used herein, a "SIMD thread group" refers to a group of up to P threads of execution of the same program on different input data, with one thread of the group being assigned to each processing engine 302. A SIMD thread group may include fewer than P threads, in which case some of processing engines 302 will be idle during cycles when that SIMD thread group is being processed. A SIMD thread group may also include more than P threads, in which case processing will take place over consecutive clock cycles. Since each processing engine 302 can support up to G threads concurrently, it follows that up to G SIMD thread groups can be executing in core 208 at any given time.

On each clock cycle, one instruction is issued to all P threads making up a selected one of the G SIMD thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD thread group in instruction unit 312, then signals instruction unit 312 to begin executing the threads. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Groups and Cooperative Thread Arrays

In some embodiments, multithreaded processing core 208 of FIG. 3 can execute general-purpose computations using thread groups. As described previously, a thread group consists of a number (n0) of threads that concurrently execute the same program on an input data set to produce an output data set. Each thread in the thread group is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread groups are arranged as "cooperative thread arrays," or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread groups) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Parallel Prefix Sum Algorithm

A prefix sum operation receives a list as input and generates a list as output. The input list should include specific elements to be processed by the prefix sum operation, which simply generates an output list that is a running accumulated sum over the list of input elements. In practice, the input list and output list may be stored separately in memory, or the output list may overwrite the input list in memory. A parallel prefix sum algorithm is described herein that performs the prefix sum operation efficiently on the parallel processing unit 202 described previously in FIG. 2.

Figure 4:
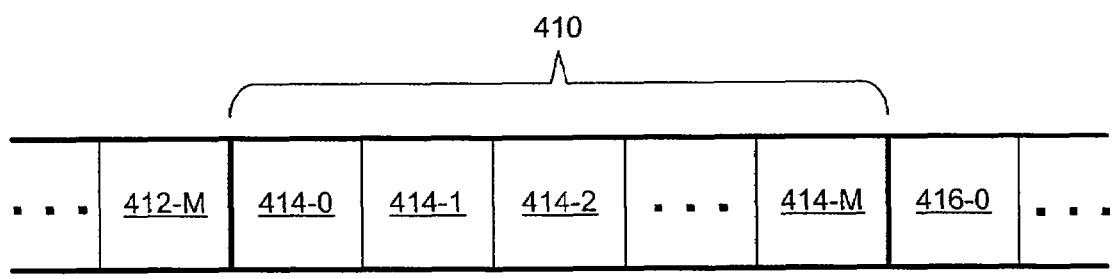
FIG. 4 illustrates sequential data stored within a processing core, according to one embodiment of the invention.

FIG. 4 illustrates sequential data stored within a processing core 208 of FIG. 2, according to one embodiment of the invention. The data may be stored in a memory structure, such as the local register file 304, shared memory 306, or global memory 320. Within a given memory structure, each representative element of an interleave span 410 may be accessed simultaneously per access cycle. For example, elements 414-0, 414-1, and so on through element 414-M may be accessed simultaneously within the same access cycle. Furthermore, element 416-0 may be accessed simultaneously with elements 414-1 through 414-M. However, if element 416-0 is requested simultaneously with element 414-0, then a request conflict may occur and only one of the two access requests will be processed in a first access cycle, and the second of the two access requests will be processed in a second access cycle. If many threads generate multiple access conflicts in the same cycle, execution performance may be severely reduced. In general, high-performance algorithms developed to execute on processing cores 208 should avoid access conflicts whenever possible.

Figure 5:
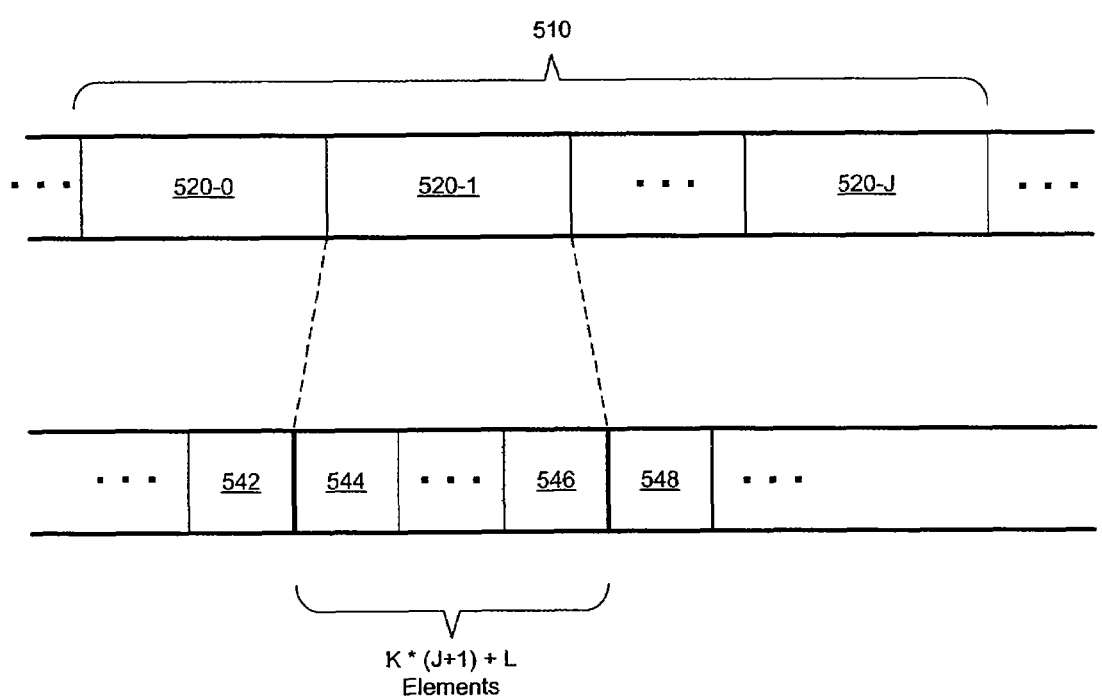
FIG. 5 illustrates a sequential list of data organized to avoid access conflicts, according to one embodiment of the invention.

FIG. 5 illustrates a sequential list of data 510 organized to avoid access conflicts, according to one embodiment of the invention. The sequential list of data 510 may be partitioned into J+1 sub-lists 520-0 through 520-J. Each sub-list 520 includes K*(J+1)+L data elements, where K is the number of data elements in an interleave span, (J+1) is the number of threads concurrently processing sub-lists 520, and L is a factor used to assure that K*(J+1)+L is relatively prime to K. For example, if K=16 and J+1=16, then L=1 is one possible solution to guarantee that K*(J+1)+L=257 is relatively prime to K. With L=1, sub-list 520-1 includes 257 data elements, including a first element 544 and a last element 546.

When the number of data elements in each sub-list 520 is relatively prime to the number of data elements in the interleave span 410, then concurrently executing SIMD threads, each processing one sub-list 520, should not generate access conflicts due to sub-list 520 access. For example, simultaneously accessing element 544, the first element in sub-list 520-1, and element 548, the first element in the subsequent sub-list, should not result in an access conflict because elements 544 and 548 are situated in different interleave positions.

The parallel prefix sum algorithm is most efficient when access conflicts are avoided. By partitioning the input list as shown in FIG. 5, with each sub-list relatively prime to the number of different interleave positions, access conflict should be avoided.

Figure 6A:
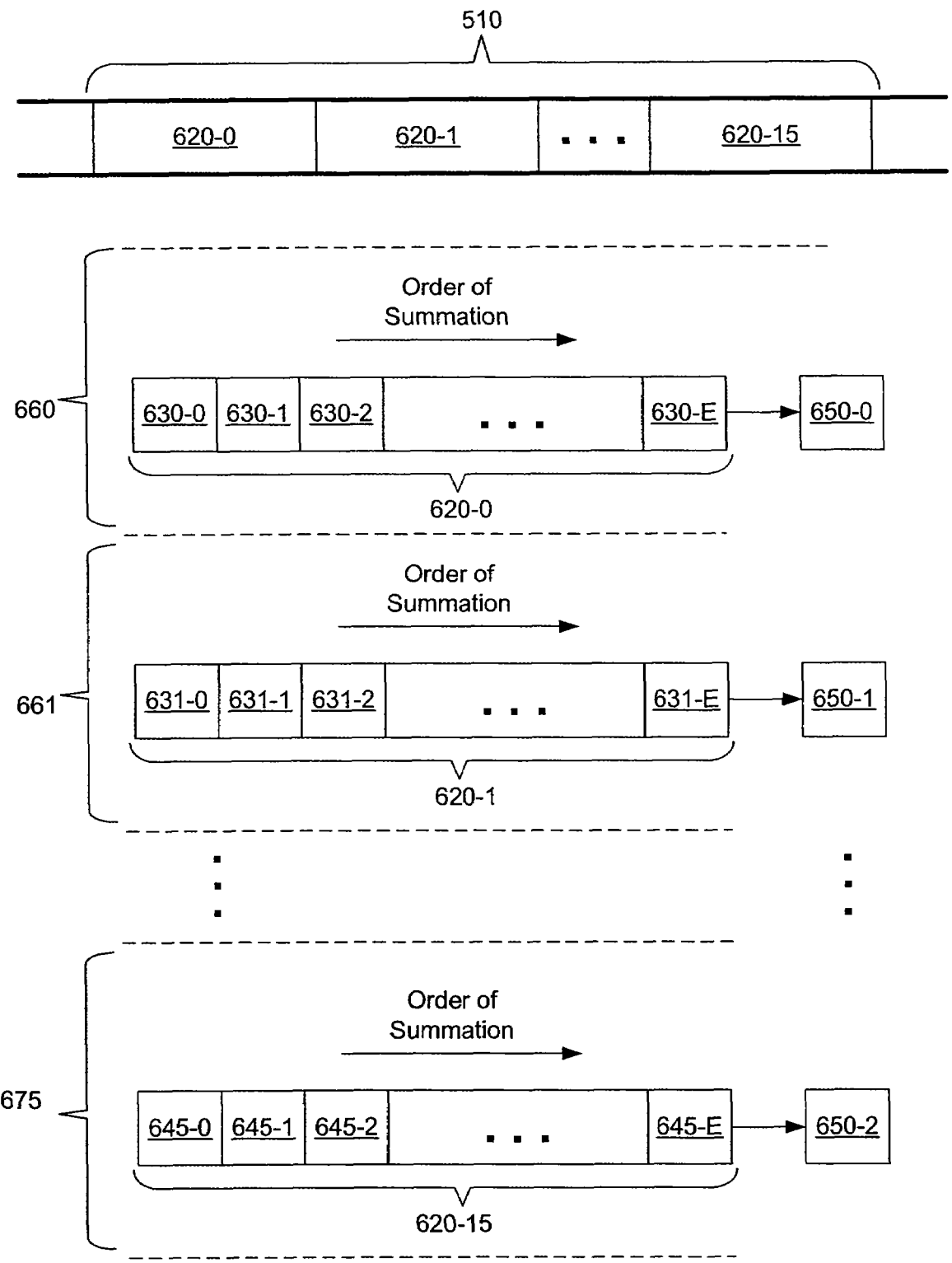
FIG. 6A illustrates a first computation phase in computing the parallel prefix sum operation, according to one embodiment of the invention.
Figure 6B:
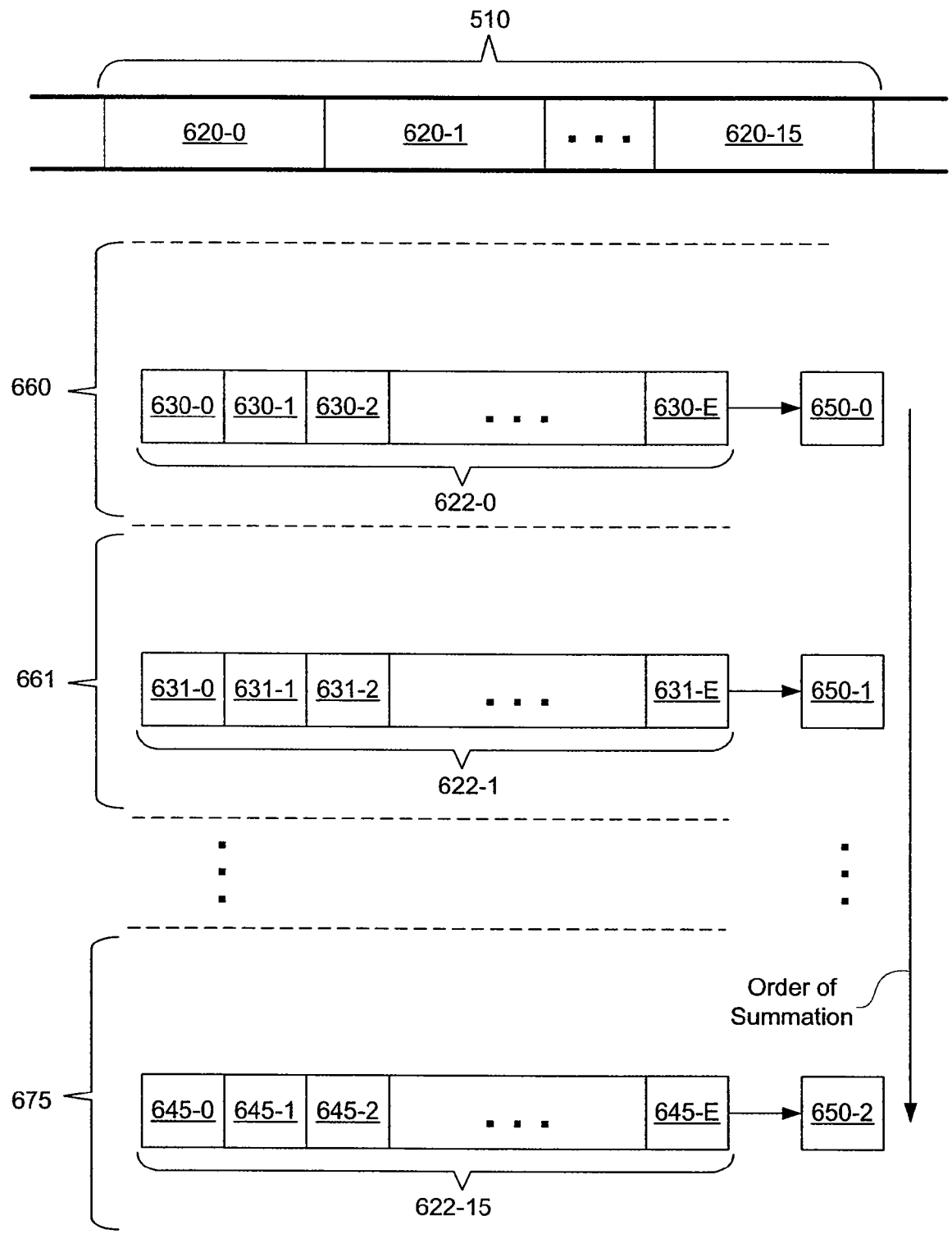
FIG. 6B illustrates a second computation phase in computing the parallel prefix sum operation, according to one embodiment of the invention.
Figure 6C:
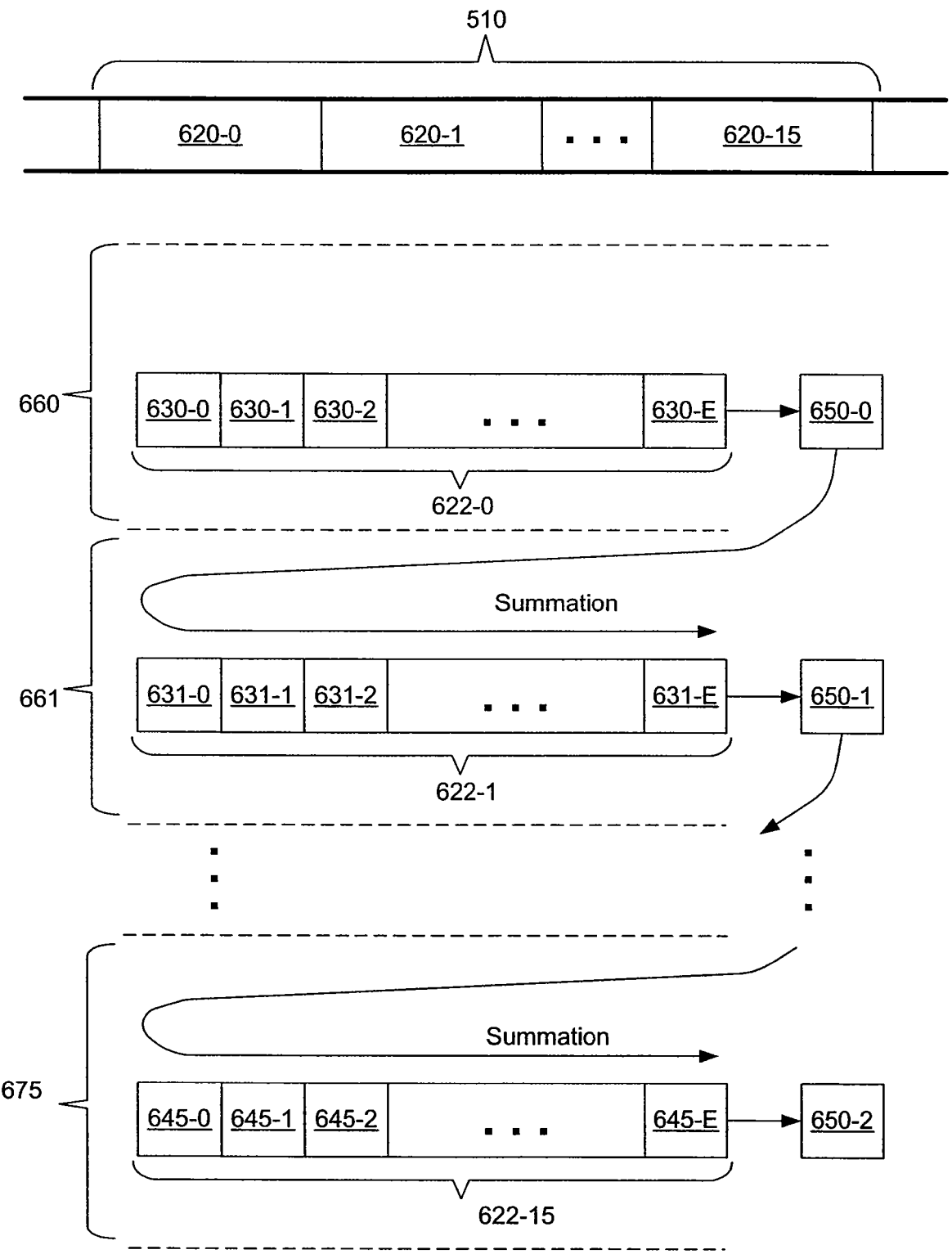
FIG. 6C illustrates a third computation phase in computing the parallel prefix sum operation, according to one embodiment of the invention.
Figure 7A:
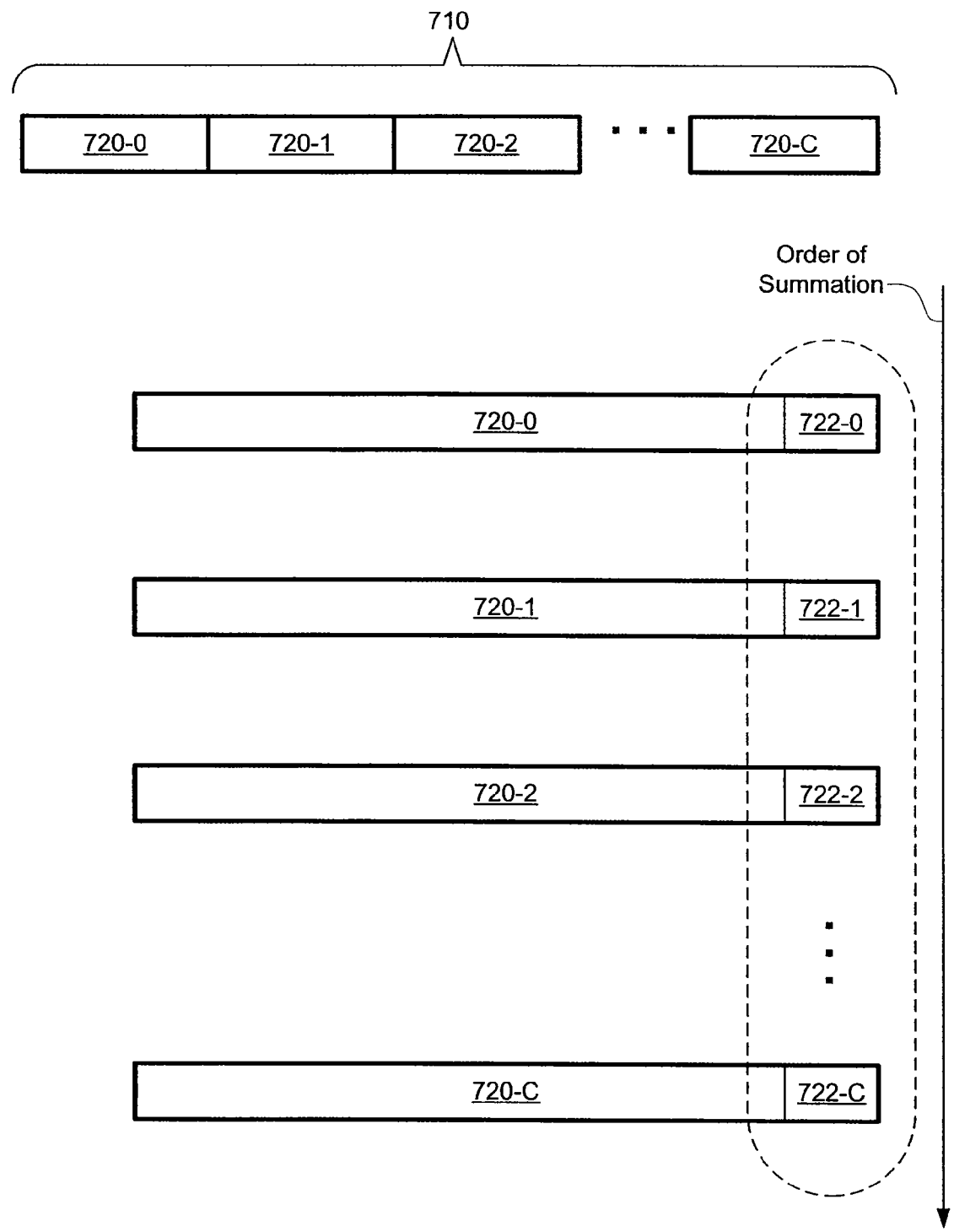
FIG. 7A illustrates a first computation phase in computing the parallel prefix sum over multiple cooperative thread arrays, according to one embodiment of the invention.
Figure 7B:
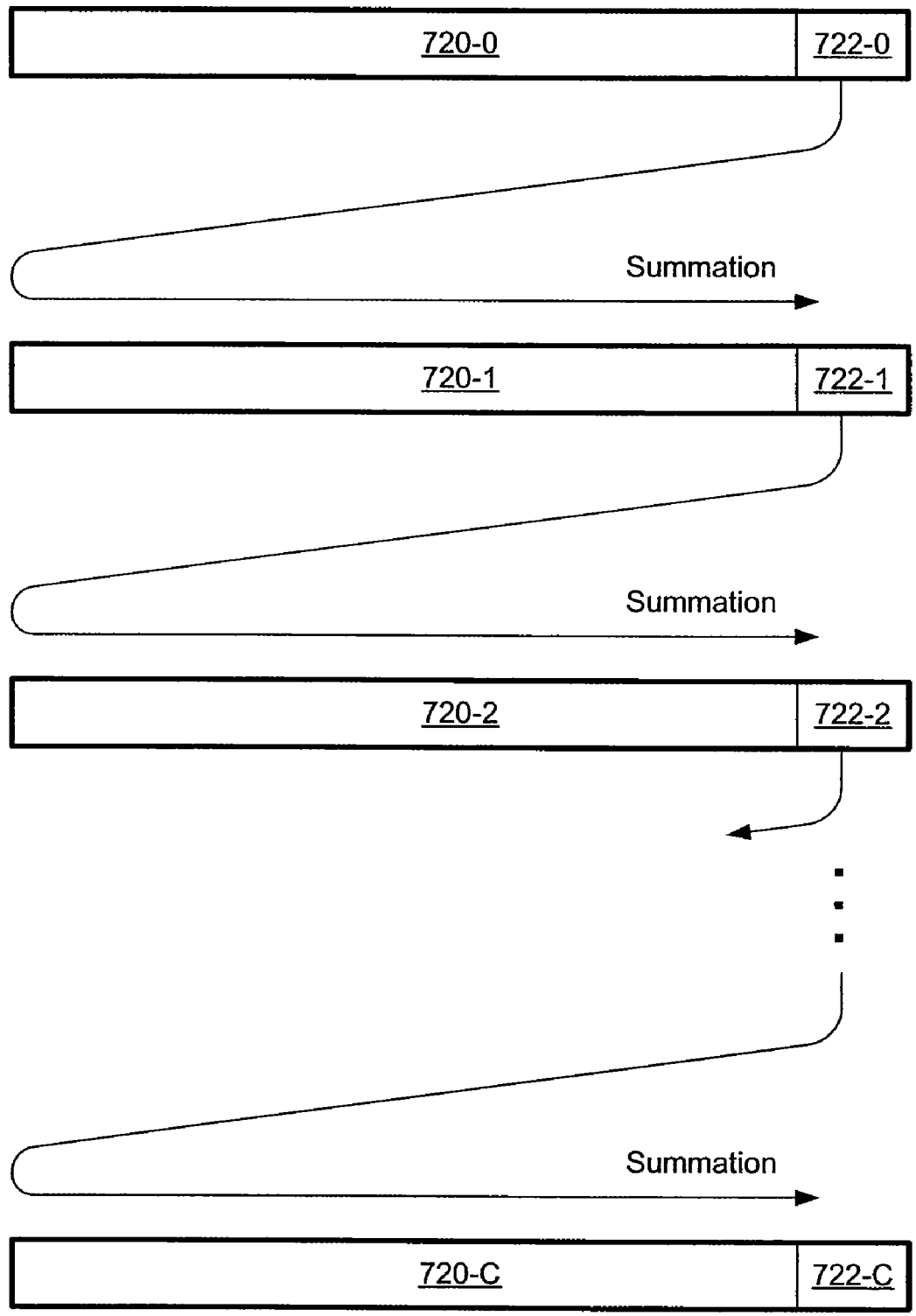
FIG. 7B illustrates a second computation phase in computing the parallel prefix sum over multiple cooperative thread arrays, according to one embodiment of the invention.

The basic parallel prefix sum algorithm includes three phases, illustrated in FIGS. 6A through 6C, which are executed within a single CTA. Multiple, parallel CTA computations may be performed on a single prefix sum input list that is partitioned over multiple CTAs. To complete the parallel prefix sum over multiple CTAs, computation steps analogous to the second and third computation phases are performed in two additional phases, as illustrated in FIGS. 7A and 7B.

FIG. 6A illustrates a first computation phase in computing the parallel prefix sum operation, according to one embodiment of the invention. The sequential list of data 510 includes sub-lists 620-0 through 620-15, where sub-list 620-0 includes the first data elements of the sequential list of data 510, and sub-list 620-15 includes the last data elements of the sequential list of data 510. Each thread 660, 661, 675 performs a prefix sum operation over an associated sub-list. For example, thread 660 performs a prefix sum operation on sub-list 620-0. Similarly, thread 661 performs a prefix sum operation on sub-list 620-1, and thread 675 performs a prefix sum operation on sub-list 620-15.

In one embodiment thread 660 adds data element 630-0 within sub-list 620-0 to data element 630-1, with the result stored to data element 630-1. Subsequently, data element 630-1 is added to data element 630-2, with the result stored to data element 630-2, and so on, until data element 630-E is likewise computed. Similarly, data elements 631 within sub-list 620-1 are summed together, and data elements 645 within sub-list 620-15 are summed together. The summation order should be from the first data element in the sub-list 620 to the last data element in the sub-list 620. After each thread completes the first computation phase, the data elements associated with each sub-list 620 contain an intermediate prefix sum sub-list. A sub-list accumulated sum is a summation of every element in the sub-list 620 and corresponds to the last value computed in the intermediate prefix sum sub-list. For example, data element 630-E is the last value computed in the intermediate prefix sum sub-list computed from sub-list 620-0. Data element 630-E is also the sub-list accumulated sum for sub-list 620-0. In one embodiment, each sub-list accumulated sum may be copied to an additional storage element. For example, data elements 630-E, 631-E and 645-E may be copied to storage elements 650-0, 650-1, 650-2, respectively.

FIG. 6B illustrates a second computation phase in computing the parallel prefix sum operation, according to one embodiment of the invention. In one embodiment, data elements of intermediate prefix sum sub-lists 622 overwrite the data elements of the sub-lists 620 in the respective memory locations. The second computation phase involves performing a prefix sum over the sub-list accumulated sum values stored in data elements 650, starting with the first sub-list accumulated sum 650-0. As shown, the order of the prefix sum computation in this second computation phase follows the order of sub-lists 620 established in the sequential list of data 510. For example, sub-list 620-0 is first in the list of sub-lists, 620-1 is second, and so on. Therefore, the prefix sum computation in this computation phase starts with data element 650-0, and proceeds to data element 650-1, and so on. The result is a list of accumulated sum values stored in data elements 650 that represent the sum of values in the entire sequential list of data 510, up to and including the associated sub-list.

FIG. 6C illustrates a third computation phase in computing the parallel prefix sum operation, according to one embodiment of the invention. The third computation phase involves adding the accumulated sum values stored in data elements 650 to each data element in a subsequent intermediate prefix sum sub-list 622. For example, the value stored in data element 650-0 is added to each data element 631, thereby incorporating the accumulated sum from sub-list 620-0 into each element of intermediate prefix sum sub-list 622-1. After each accumulated sum value stored in data elements 650 is added to each data element within each subsequent intermediate prefix sum sub-list 622, the prefix sum computation over the sequential list of data 510 is complete. Importantly, each thread 660, 661, 675 performs this computation phase in parallel.

When multiple CTAs are used to compute prefix sum operations over larger lists of data, the three-phase algorithm described in FIGS. 6A-C may be extended to include two additional computation phases that are similar to the second and third computation phases described in FIGS. 6B and 6C. These two additional computation phases are described in FIGS. 7A and 7B.

FIG. 7A illustrates a first computation phase in computing the parallel prefix sum over multiple cooperative thread arrays, according to one embodiment of the invention. An aggregate sequential list of data 710 includes data elements that serve as inputs to a parallel prefix sum operation performed over multiple CTAs. The aggregate sequential list of data 710 may be partitioned into sequential lists of data 720 that are distributed to at least two CTAs. In one embodiment, the distribution process may include copying portions of the aggregate sequential list of data 710 to local storage within a given core 208 of FIG. 2.

After each CTA receives a sequential list of data 720, the CTA may process the sequential list of data 720 according to the techniques described in FIGS. 6A-C. For example, a first CTA may process sequential list of data 720-0, a second CTA may process sequential list of data 720-1, and so forth, up to C+1 CTAs. Importantly, each sequential list may be processed by an associated CTA in parallel. After the CTAs have completed a first set of parallel prefix sum operations on the different sequential lists of data 720, each sequential list constitutes a "prefix sum sequential list of data," meaning that the values reflected in a given sequential list are now the prefix sum values of the original sequential list. Further, a set of "accumulated prefix sum sequential list values" are now available in storage locations 722, where each such value is the last element in a given prefix sum sequential list. In this way, the accumulated sequential list values stored in storage locations 722 correspond to instances of data element 650-2 in FIG. 6C, where each CTA generates an instance of data element 650-2.

Once the accumulated prefix sum sequential list values are computed and written to storage locations 722, a prefix sum operation is performed over these values, replacing the values stored in storage locations 722 with "CIA accumulated sum values." As shown, the order of summation starts with the accumulated prefix sum sequential list value stored in 722-0 and proceeds to the accumulated prefix sum sequential list value 722-C at the end of the list. In one embodiment, one thread in each CTA performs this operation so that the results may be stored locally to each core 308 within PPU 302, thereby providing each CTA with local access to the results of this operation. At this point in the overall operation, the CTA accumulated sum value stored in 722-C represents the global sum of all elements in the aggregate sequential list of data 710.

As shown in FIG. 7B, to complete the prefix sum operation across multiple CTAs, each CTA accumulated sum value is added to every data element in the subsequent prefix sum sequential list of data 720. For example, the CTA accumulated sum value stored in 722-0 is added to each data element of the prefix sum sequential list of data 720-1, and the CTA accumulated sum value stored in 722-1 is added to each data element of the prefix sum sequential list of data 720-2, etc. In one embodiment, the threads of a different CTA perform this operation across each of the prefix sum sequential lists of data 720. In this fashion, the CTAs can perform this portion of the overall operation in parallel. The resulting data stored in memory locations 720 represents a completed prefix sum for the aggregate sequential list of data 710.

Figure 8:
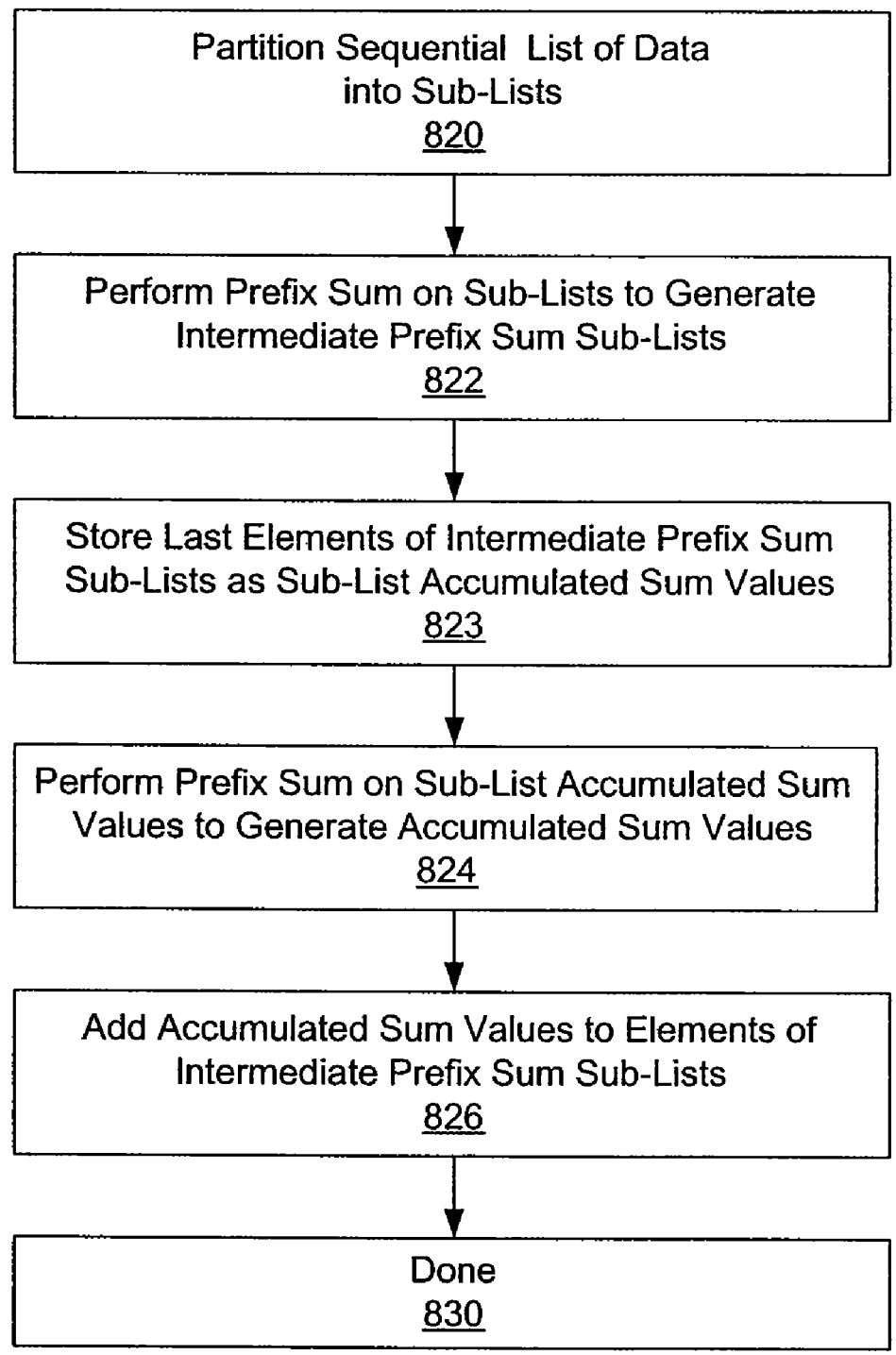
FIG. 8 is a flow diagram of method steps for computing a parallel prefix sum operation within a single CTA, according to one embodiment of the invention.

FIG. 8 is a flow diagram of method steps for computing a parallel prefix sum operation within a single CTA, according to one embodiment of the invention. Although the method steps are described in conjunction with the systems of FIGS. 1, 2 and 3, persons skilled in the art will understand that any system that performs the method steps, in any order, is within the scope of the invention.

The method begins in step 820, where the sequential list of data 510 is partitioned into sub-lists for processing by each thread within a CTA. As discussed in FIGS. 4 and 5, each sub-list is selected to be relatively prime in length to the interleave span 410 of the memory structure used to store the sequential list of data 510.

In step 822, parallel processing engines 302 each execute a thread that performs a prefix sum on each associated sub-list to generate intermediate prefix sum sub-lists, as discussed in FIG. 6A.

In step 823, parallel processing engines 302 execute a thread that stores the last elements of the intermediate prefix sum sub-lists as sub-list accumulated sum values.

In step 824, parallel processing engines 302 execute a thread that performs a prefix sum operation on the sub-list accumulated sum values to generate a list of accumulated sum values, as described in FIG. 6B.

In step 826, parallel processing engines 302 each execute a thread that adds an accumulated sum value to each element of a subsequent intermediate prefix sum sub-list, as discussed in FIG. 6C.

The method terminates in step 830.

Figure 9:
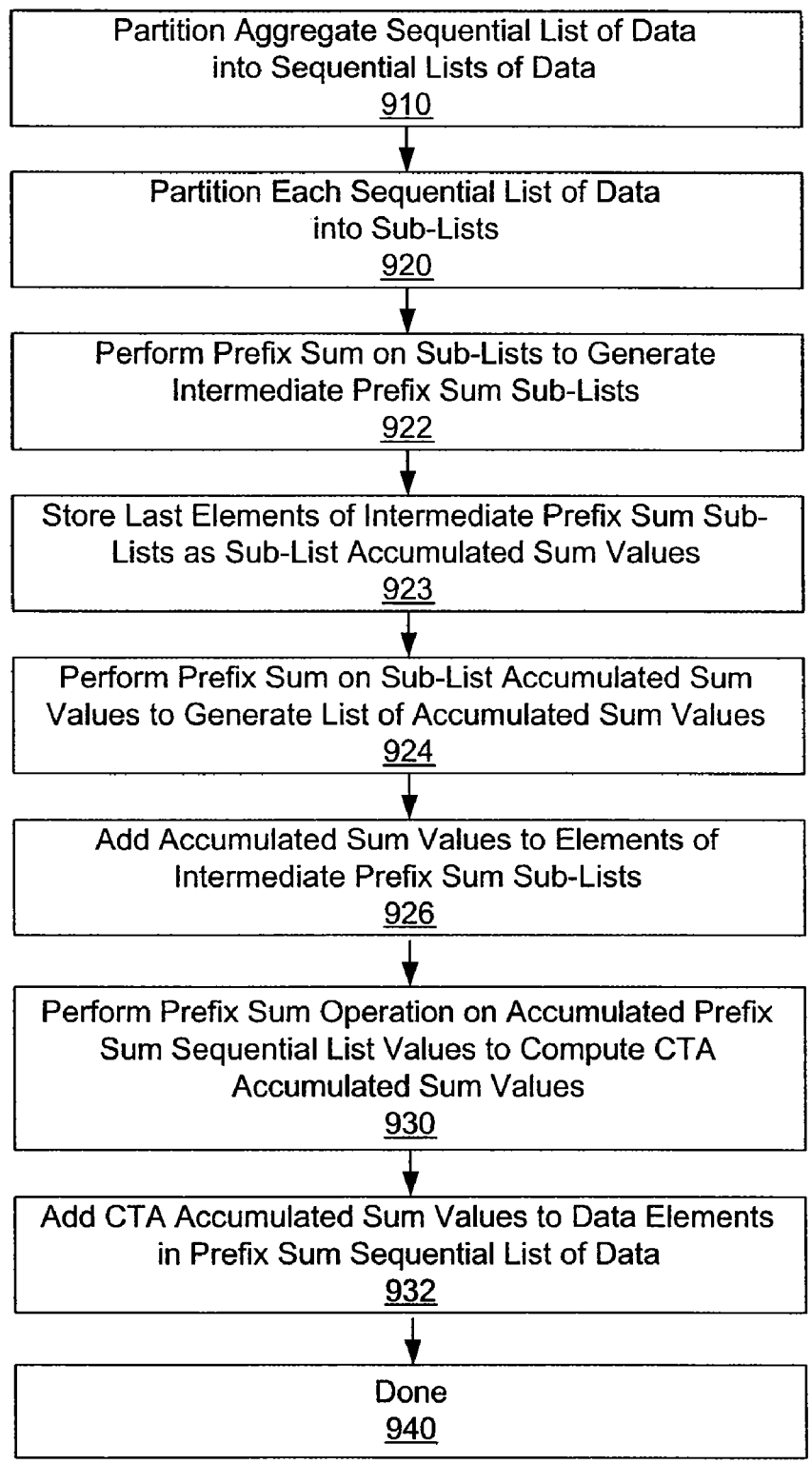
FIG. 9 is a flow diagram of method steps for computing a parallel prefix sum operation using multiple CTAs, according to one embodiment of the invention.

FIG. 9 is a flow diagram of method steps for computing a parallel prefix sum operation using multiple CTAs, according to one embodiment of the invention. Although the method steps are described in conjunction with the systems of FIGS. 1, 2 and 3, persons skilled in the art will understand that any system that performs the method steps, in any order, is within the scope of the invention.

The method begins in step 910, where an aggregate sequential list of data 710 is partitioned into smaller sequential lists of data 720 for processing by multiple CTAs. The partitioning process may include copying each partition to local memory structures for processing by CTAs associated with the local memory structures.

In step 920, each sequential list of data 720 is partitioned into sub-lists for processing by the threads within a particular CTA. As discussed in FIGS. 4 and 5, the length of each sub-list is selected to be relatively prime to the interleave span 410 of the memory structure used to store the sequential list of data 720.

In step 922, for each sequential list of data 720, the parallel processing engines 302 within a core 308 execute threads that each perform a prefix sum on an associated sub-list to generate intermediate prefix sum sub-lists, as discussed in FIG. 6A. Again, each CTA that processes one of the sequential lists of data 720 executes within a core 208 of PPU 202, with the different threads of the CTA executing within the parallel processing engines 302 within the core 208.

In step 923, for each sequential list of data 720, one parallel processing engine 302 executes a thread that stores the last element of each intermediate prefix sum sub-list as a set of sub-list accumulated sum values, as described in FIG. 6A.

In step 924, for each sequential list of data 720, one parallel processing engine 302 executes a thread that performs a prefix sum operation on the sub-list accumulated sum values to generate a list of accumulated sum values, as described in FIG. 6B.

In step 926, for each sequential list of data 720, the parallel processing engines 302 within the core 308 execute threads that each add a particular accumulated sum value to each element of a subsequent intermediate prefix sum sub-list, as discussed in FIG. 6C. As a result of steps 910-926, a prefix sum operation has been completed on each sequential list of data 720, as previously described herein. As described in FIGS. 7A-7B, each sequential list of data 720 is referred to as a "prefix sum sequential list 720" at this stage of the overall prefix sum operation.

The method then proceeds to step 930, where, in one embodiment, a thread of each CTA performs a prefix sum operation across the accumulated prefix sum sequential list values 722 to compute CTA accumulated sum values 722, as described in FIG. 7A. These prefix sum operations may be performed in parallel and the results stored locally to each core 308 within PPU 302, thereby providing each CTA with local access to the results. In step 932, each CTA accumulated sum value 722 is added to every data element in a subsequent prefix sum sequential list of data 720, as described in FIG. 7B. For example, the CTA accumulated sum value stored in 722-0 is added to each data element of the prefix sum sequential list of data 720-1, and the CTA accumulated sum value stored in 722-1 is added to each data element of the prefix sum sequential list of data 720-2, etc. In one embodiment, the threads of a different CTA perform this operation across each of the prefix sum sequential lists of data 720. In this fashion, the CTAs can perform this portion of the overall operation in parallel. The resulting data stored in memory locations 720 represents a completed prefix sum for the aggregate sequential list of data 710.

The method terminates in step 940.

In sum, a technique for computing a parallel prefix sum using one or more CTAs within a GPU is disclosed. In one embodiment, a parallel prefix sum operation executes within a single CTA in three computation phases. In the first phase, each thread within the CTA processes a sub-list of a prefix sum input list to generate an intermediate prefix sum sub-list. The last element generated in the intermediate prefix sum sub-list is the sub-list accumulated sum for that respective sub-list. In the second computation phase, the sub-list accumulated sum values are processed in a prefix sum operation to generate a list of accumulates sum values. Each accumulated sum value represents the total accumulated sum of all list elements within the CTA, up to and including the associated sub-list elements. In the third computation phase, each accumulated sum value is added to each element of the subsequent intermediate prefix sum sub-list to yield a prefix sum result that is complete within the context of the given CTA. In a second embodiment, the parallel prefix sum operation is performed over multiple CTAs, using two additional computation phases. In the first additional computation phase, the last accumulated sum value of the prefix sum result generated by each CTA is processed by an additional prefix sum operation to generate a list of CTA accumulated sum values. Each CTA accumulated sum value corresponds to a complete sum over all list elements generated by all previous CTAs and by the current CTA. In the second additional computation phase, each CTA accumulated sum value is added to each element of the subsequent prefix sum result, i.e., the prefix sum result generated by the subsequent CTA. After this second additional processing phase, a list formed by concatenating each sub-list within each CTA is the completed output of the overall parallel prefix sum operation.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A method for performing a parallel prefix sum operation, the method comprising:

partitioning an input list of data elements into a plurality of sub-lists that includes a first sub-list and a second sub-list, wherein the first and second sub-lists have a size of K*(J+1)+L data elements, and wherein K is an interleave size of a local memory structure, (J+1) is a number of threads concurrently processing sub-lists, and L is a factor;

performing, by threads executing within a processing core, a first prefix sum operation on the first sub-list to generate a first intermediate prefix sum sub-list, and performing a second prefix sum operation on the second sub-list to generate a second intermediate prefix sum sub-list, wherein a last element of the first intermediate prefix sum sub-list comprises a first sub-list accumulated sum value, and a last element of the second intermediate prefix sum sub-list comprises a second sub-list accumulated sum value;

performing, by threads executing within the processing core, a second prefix sum operation across the first and second sub-list accumulated sum values to generate a first accumulated sum value and a second accumulated sum value; and adding, by threads executing within the processing core, the first accumulated sum value to each data element of the second intermediate prefix sum sub-list to produce a third intermediate prefix sum sub-list, wherein a combination of the first intermediate prefix sum sub-list and the third intermediate prefix sum sub-list is equivalent to a prefix sum over the first sub-list and the second sub-list.

2. The method of claim 1, wherein L assures that the first and second sub-lists are relatively prime in size to the interleave size of the local memory structure.

3. The method of claim 1, wherein a thread group that includes a first thread and a second thread performs the parallel prefix sum operation.

4. The method of claim 3, wherein the first thread performs the first prefix sum operation and the second thread performs the second prefix sum operation.

5. The method of claim 3, wherein the first thread executes within a first processing engine in the processing core and the second thread executes within a second processing engine in the processing core.

6. The method of claim 5, wherein the first processing engine and the second processing engine execute substantially similar instructions, dispatched from a common instruction unit.

7. The method of claim 5, wherein the thread group is part of a cooperative thread array (CTA) and threads in the CTA execute concurrently within the processing core.

8. The method of claim 1, wherein the first intermediate prefix sum sub-list and the first sub-list reside in a first memory location in the local memory structure, and the second intermediate prefix sum sub-list and the second sub-list reside in a second memory location in the local memory structure.

9. A computer-readable medium including instructions that, when executed by a processing unit, cause the processing unit to perform a parallel prefix sum operation, by performing the steps of:

partitioning an input list of data elements into a plurality of sub-lists that includes a first sub-list and a second sub-list, wherein the first and second sub-lists have a size of K*(J+1)+L data elements, and wherein K is an interleave size of a local memory structure, (J+1) is a number of threads concurrently processing sub-lists, and L is a factor;

performing a first prefix sum operation on the first sub-list to generate a first intermediate prefix sum sub-list, and performing a second prefix sum operation on the second sub-list to generate a second intermediate prefix sum sub-list, wherein a last element of the first intermediate prefix sum sub-list comprises a first sub-list accumulated sum value, and a last element of the second intermediate prefix sum sub-list comprises a second sub-list accumulated sum value;

performing a second prefix sum operation across the first and second sub-list accumulated sum values to generate a first accumulated sum value and a second accumulated sum value; and adding the first accumulated sum value to each data element of the second intermediate prefix sum sub-list to produce a third intermediate prefix sum sub-list, wherein a combination of the first intermediate prefix sum sub-list and the third intermediate prefix sum sub-list is equivalent to a prefix sum over the first sub-list and the second sub-list.

10. The computer-readable medium of claim 9, wherein a thread group that includes a first thread and a second thread performs the parallel prefix sum operation.

11. The computer-readable medium of claim 10, wherein the first thread performs the first prefix sum operation and the second thread performs the second prefix sum operation.

12. The computer-readable medium of claim 10, wherein the first thread and the second thread execute substantially similar instructions, dispatched from a common instruction unit.

13. The computer-readable medium of claim 10, wherein the thread group is part of a cooperative thread array (CTA) and threads in the CTA execute concurrently within the processing core.

14. The computer-readable medium of claim 9, wherein L assures that the first and second sub-lists are relatively prime in size to the interleave size of the local memory structure.

15. A computing device configured to perform a parallel prefix sum operation, the computing device comprising:

a system memory; and a processing unit coupled to the system memory and having a processing core that includes a first processing engine and a second processing engine, each processing engine coupled to a local memory structure, wherein a thread group executes within the processing core and is configured to:

partition an input list of data elements into a plurality of sub-lists that includes a first sub-list and a second sub-list, wherein the first and second sub-lists have a size of $K*(J+1)+L$ data elements, and wherein K is an interleave size of the local memory structure, (J+1) is a number of threads concurrently processing sub-lists, and L is a factor, perform a first prefix sum operation on the first sub-list to generate a first intermediate prefix sum sub-list, and performing a second prefix sum operation on the second sub-list to generate a second intermediate prefix sum sub-list, wherein a last element of the first intermediate prefix sum sub-list comprises a first sub-list accumulated sum value, and a last element of the second intermediate prefix sum sub-list comprises a second sub-list accumulated sum value, perform a second prefix sum operation across the first and second sub-list accumulated sum values to generate a first accumulated sum value and a second accumulated sum value, and add the first accumulated sum value to each data element of the second intermediate prefix sum sub-list to produce a third intermediate prefix sum sub-list, wherein a combination of the first intermediate prefix sum sub-list and the third intermediate prefix sum sub-list is equivalent to a prefix sum over the first sub-list and the second sub-list.

16. The computing device of claim 15, wherein L assures that the first and second sub-lists are relatively prime in size to the interleave size of the local memory structure.

17. The computing device of claim 15, wherein the thread group includes a first thread that performs the first prefix sum operation and a second thread that performs the second prefix sum operation.

18. The computing device of claim 17, wherein the first thread executes within the first processing engine in the processing core and the second thread executes within the second processing engine in the processing core.

19. The computing device of claim 18, wherein the first processing engine and the second processing engine execute substantially similar instructions, dispatched from a common instruction unit.

20. The computing device of claim 15, wherein the thread group is part of a cooperative thread array (CTA) and threads in the CTA execute concurrently within the processing core.

21. The computing device of claim 15, wherein the first intermediate prefix sum sub-list and the first sub-list reside in a first memory location in the local memory structure, and the second intermediate prefix sum sub-list and the second sub-list reside in a second memory location in the local memory structure.

* * * * *